March 9, 1926.  1,575,873
C. McG. SYKES
SEMIAUTOMATIC WEIGHING APPARATUS
Filed May 21, 1924    2 Sheets-Sheet 2

Inventor:—
Cameron McG. Sykes
by George E. Folkes.
his Attorney

Patented Mar. 9, 1926.

1,575,873

UNITED STATES PATENT OFFICE.

CAMERON McGREGOR SYKES, OF BIRMINGHAM, ENGLAND, ASSIGNOR TO W. & T. AVERY, LIMITED, OF BIRMINGHAM, ENGLAND.

SEMIAUTOMATIC WEIGHING APPARATUS.

Application filed May 21, 1924. Serial No. 714,898.

*To all whom it may concern:*

Be it known that CAMERON MCGREGOR SYKES, a subject of the King of Great Britain, residing at Soho Foundry, Birmingham, England, has invented a new and useful Improvement in Semiautomatic Weighing Apparatus; and he does hereby declare the following to be a full, clear, and exact description of the same.

This invention has reference to improvements in semi-automatic dial weighing mechanism and relates specifically to weighing mechanism of the kind described and claimed in the specification of my pending application, Serial No. 558989 filed May 6th, 1922.

In weighing mechanism of this kind a steelyard and poise weight mechanism is combined with a dial indicator and the load is initially automatically balanced by a spring resistant which automatically determines the position of an indicator utilized in connection with the positioning of the poise weight the load being subsequently balanced as to its major order by the steelyard and poise weight mechanism and as to its minor order automatically by a pendulous resistant.

The present invention has for its object improvements in the construction and arrangement of weighing mechanism of the aforesaid kind.

The invention consists of a weighing mechanism of the aforesaid kind wherein the pointer for indicating the minor order of weighment is fixed to a lever which is connected to a motion damping device, said lever cooperating with an overbalanced lever connected to the steelyard, said steelyard being fulcrumed in a swinging shackle and provided with a pendulous resistant. The invention also resides in the improved construction of a weighing mechanism of the aforesaid character.

The invention will now be described with particular reference to the accompanying drawings, in which:—

Figure 1:
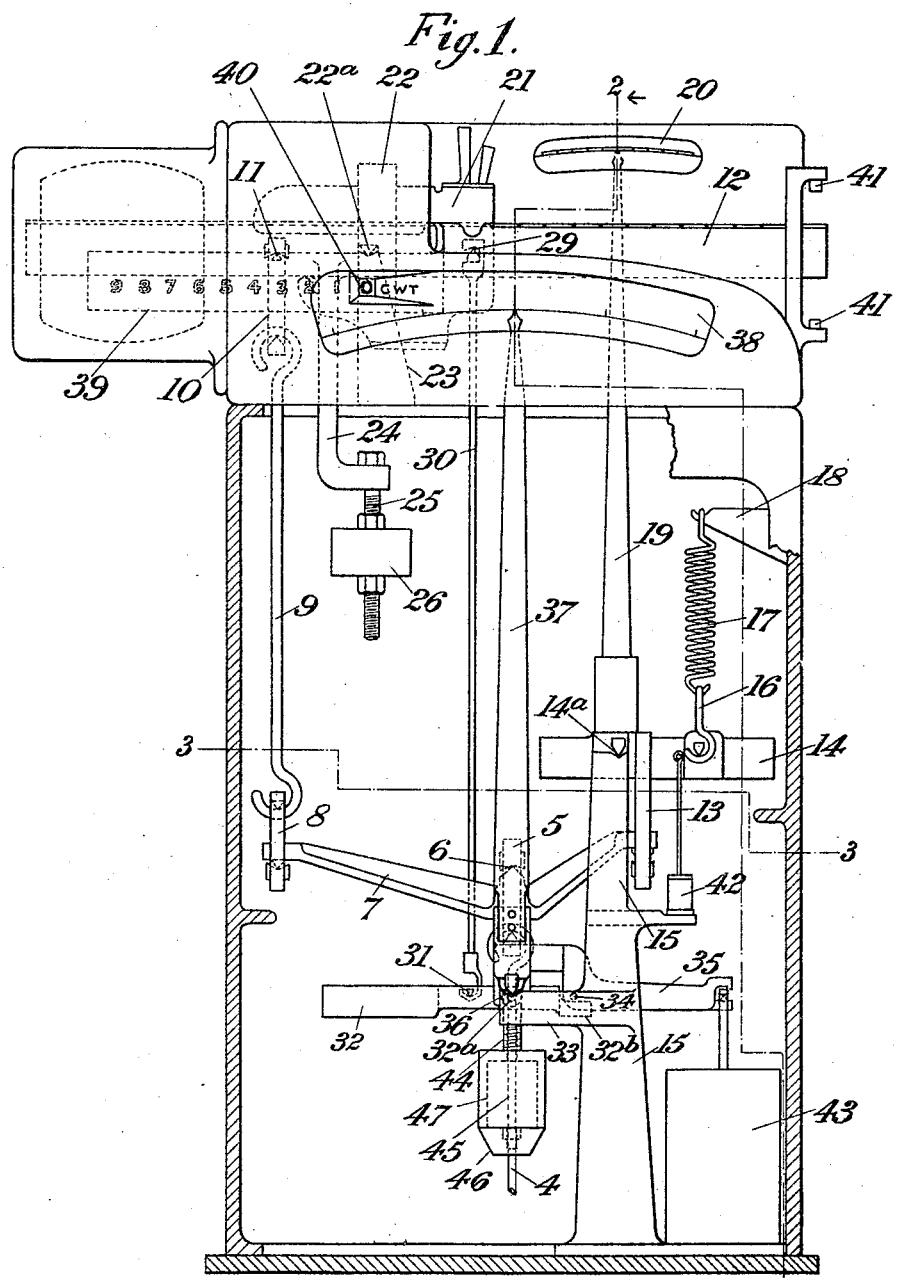
Fig. 1 is a part sectional front elevation of that part of the weighing mechanism which embodies the features of the present invention.

The platform or weighbridge to which the load is to be applied is connected in the ordinary manner to a connecting rod 4. This connecting rod 4 is suspended by a shackle 5 from the center knife-edge 6 of an intermediate lever 7, this lever in turn being suspended at one end by means of a shackle 8, rod 9 and shackle 10 from the back knife-edge 11 of a steelyard 12 and at the other end by means of a shackle 13 from a lever 14. This lever 14 is fulcrumed by means of a knife-edge 14ª on a pedestal 15 mounted on the base plate and is connected by a link 16 to a coil spring 17 which depends from an arm 18 secured to the housing. Attached to the lever 14 is an index pointer 19 which is adapted to register against the chart 20 for a purpose to be hereinafter more fully described.

Figure 2:
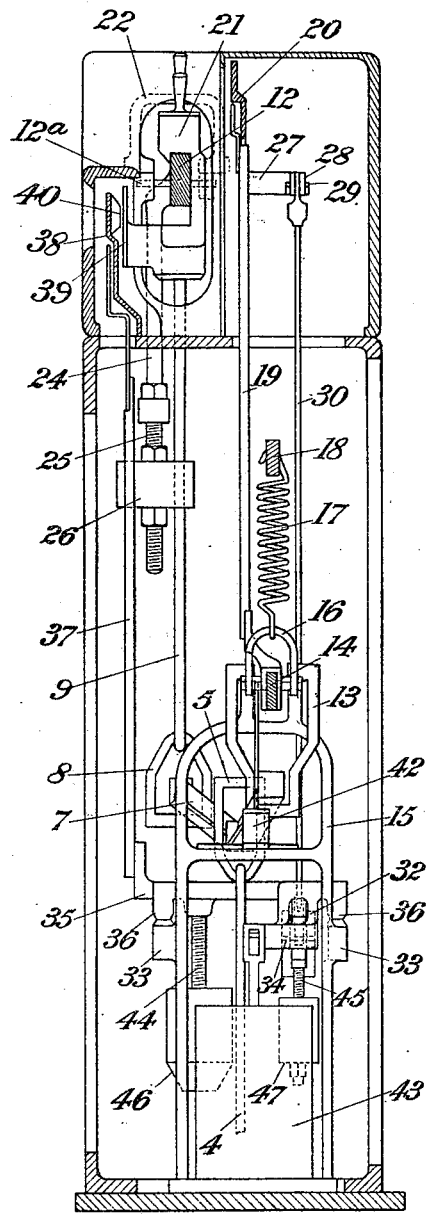
Fig. 2 is a sectional end elevation taken on the line 2—2 Figure 1 looking in the direction of the arrow.
Figure 3:
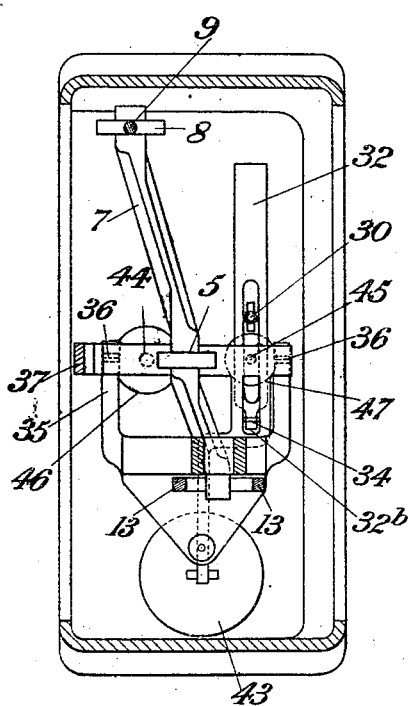
Fig. 3 is a plan taken on the line 3—3 of Figure 1.

The spring 17 forms the automatic resistant for any load which is applied to the weighing mechanism within the capacity thereof and said spring also serves to indicate the required setting of the poise weight 21 on the steelyard 12 as will be described later. The steelyard 12 is fulcrumed by means of the knife-edges 12ª upon bearings mounted in a swinging shackle 22 which in turn is mounted by means of knife-edges 22ª on bearings formed in a bracket 23 secured to the housing. Secured to the steelyard 12 is a vertical rod 24 which is cranked at its lower end and has attached thereto a screwed spindle 25 on which is adjustably mounted a pendulous weight 26 the vertical axis of the weight being disposed in the plane of the knife-edge 12ª. An arm 27 is secured to or formed integral with the steelyard 12 and this arm 27 carries a bar 28 which is disposed parallel to the steelyard said bar 28 being provided with a knife-edge 29 from which depends a rod 30 which is connected at its lower end by means of a knife-edge 31 to an overbalanced lever 32. This lever 32 is fulcrumed in an extension 33 forming part of the pedestal 15 by means of pins 32ª and is formed with a projecting section 32ᵇ the upper surface of which is adapted to contact with a pin 34 carried by a bifurcated lever 35 which is fulcrumed on knife-edges 36 carried by the extension 33 as is clearly seen in Figure 2. Secured to the lever 35 and symmetrical about the vertical axis of its fulcrum is an index pointer 37 which is adapted to traverse and register against a chart 38, said pointer 37 affording an indication of the minor order of the load in a manner to be described. Screwed rods 44, 45 having pendulous weights 46, 47 adjustably mounted thereon are secured to the lever 35 said weights serving to partially counterbalance the minor order of the load transmitted through the steelyard 12.

The major order of the weighment is indicated by means of the graduations on a plate 39 secured to and traversable with the poise weight 21 as viewed through an aperture 40 formed in the chart 38. The graduations on the plate 39 are co-ordinated with the graduations of the steelyard. The poise weight mounted on the steelyard is provided with a nib and is adapted for adjustment in the well known manner. The free end of the long arm of the steelyard projects through an aperture in the side wall of the housing and has motion therein limited by the stops 41, means such as a tumbler (not shown) being preferably provided to lock the steelyard when the same is not in use.

The motion of the lever 14 is damped by means of the dashpot 42 mounted on the pedestal 15 and the motion of the lever 35 by the dashpot 43 mounted on the base of the housing.

The operation of the scale is as follows: Upon the application of a load to the weighing platform the weight is transmitted through the connecting rod 4 to the intermediate lever 7 and is distributed simultaneously to the spring 17 and the steelyard 12, the poise weight being in the zero position, and the application of the load to the steelyard causes the free end thereof to rise until it abuts and is locked against the upper of the stops 41. Meanwhile if the load is above say one hundredweight the pointer 37 traverses completely the chart 38 and becomes obscured behind the right hand side of the chart housing, and the knife-edge 11 constitutes a fixed point of suspension for the left hand of the intermediate lever 7. The load is thus wholly transmitted to the spring 17 through the link 13, lever 14 and link 16 thereby extending the spring 17 and rocking the lever 14 and thus moving the index pointer 19 attached thereto across the chart 20 and in the position of equilibrium registering against a marking on the chart 20. This marking of the chart 20 corresponds with a designation of one of the notches of the steelyard, to which notch the poise weight 22 is then moved and when in this position completely balances the load as to its major order and also transfers the load from the spring 17 to the steelyard. In this position the graduation on the plate 39 corresponding to the notch in the steelyard at which the poise weight is set is visible through the aperture 40 and affords an indication of the major order of the load. Since perfect equilibrium may not yet be attained the pendulous weight 26 which forms part of the steelyard 12 swings outwardly and tends to return the steelyard to its horizontal position and thus lowers the arm 27, bar 28 and rod 30 and permits the long arm of the overbalanced lever 32 to fall whereby the projection 32ᵇ on the said lever bears against the pin 34 secured to the lever 35 and rocks the said lever 35 about its fulcrum until equilibrium is attained, and since the index pointer 37 is attached to the lever 35 the said pointer is traversed across the face of the chart 38 and indicates thereon the minor order of the load, the major order of the load being simultaneously indicated through the aperture 40.

It will be seen that in a weighing mechanism constructed in accordance with the present invention the pendulous weight 26 which partially counterbalances the minor part of the load has only a small arc of motion and thereby admits of the easy grading of the chart 38 giving substantially equal divisions of the chart for equal increments of load. In addition the method of mounting the index pointers admits of a large magnification of the movement of the counterbalancing mechanism and at the same time eliminates the employment of steel ribbons, cams, segments and like devices usually employed in weight indicating mechanism.

Claims:

1. A weighing mechanism comprising in combination a steelyard, a poise weight mounted on and traversable along the said steelyard, an automatic resistant, an indicator connected to said resistant, a chart co-ordinated with the graduations of the steelyard and adapted to co-operate with said indicator said chart affording an indication of the required setting of the poise weight to counterbalance the major order of the load, a pendulous resistant in connection with said steelyard, an indicator connected to said pendulous resistant, a chart adapted to co-operate with said indicator and affording an indication of the minor order of the weighment, means whereby the load acts independently upon each of said resistants, and means connected to said poise weight for indicating the major order of the weighment the weight indication being disposed in co-relation with the chart for indicating the minor order of weighment.

2. A weighing mechanism comprising in combination a housing, a swinging shackle mounted in said housing, a steelyard mounted in said shackle, a poise weight mounted on and traversable along said steelyard, an automatic resistant, an index pointer connected to said resistant, a chart co-ordinated with the graduations of the steelyard and adapted to co-operate with said pointer, a pendulous resistant in connection with said steelyard and adapted to counterbalance the minor order of weighment, an index pointer connected to said pendulous resistant, a chart adapted to co-operate with said pointer and adapted to afford an indication of the minor order of weighment, an intermediate lever having connection with the steelyard and the automatic resistant, connecting means between said intermediate lever and the load platform, and means connected to said poise weight for indicating the major order of the weighment the weight indication being disposed in co-relation with the chart for indicating the minor order of weighment.

3. A weighing mechanism comprising in combination a housing, a swinging shackle mounted in said housing, a steelyard mounted in said shackle, a poise weight mounted on and traversable along said steelyard, an automatic resistant, a secondary lever in connection with said resistant, an overbalanced lever connected to said steelyard, a pendulous resistant in connection with said overbalanced lever, an intermediate lever having connection with the steelyard and said secondary lever, an index pointer connected to said secondary lever, a chart adapted to co-operate with said pointer to afford an indication of the required setting of the poise weight to counterbalance the major order of the load, an index pointer connected to said pendulous resistant, a chart adapted to co-operate with said pointer to indicate the minor order of weighment, means for transferring the pull of a load to said intermediate lever, and means connected to said poise weight for indicating the major order of the weighment the weight indication being disposed in co-relation with the chart for indicating the minor order of weighment.

4. A weighing mechanism comprising in combination a housing, a swinging shackle mounted in said housing, a steelyard mounted in said shackle, a poise weight mounted on and traversable along said steelyard, a spring resistant anchored at one end to said housing, a secondary lever connected to the other end of said spring, an overbalanced lever, a lever in connection with said overbalanced lever, pendulous resistants connected to the last mentioned lever, connecting means between the overbalanced lever and the steelyard, an index pointer connected to said secondary lever, a chart adapted to co-operate with said pointer to afford an indication of the required setting of the poise weight to counterbalance the major order of weighment, an index pointer connected to said resistant lever, a chart adapted to co-operate with said pointer to afford an indication of the minor order of weighment, an intermediate lever having connexion with the steelyard and the secondary lever, connecting means for transferring the pull of a load to said intermediate lever, a graduated plate connected to said poise weight and having its graduations co-ordinated with the markings of the steelyard, and means co-operating with said plate to afford an indication of the major order of the load.

In testimony whereof, I have signed my name to this specification.

CAMERON McGREGOR SYKES.